No. 798,645. PATENTED SEPT. 5, 1905.
F. L. O. WADSWORTH.
MANUFACTURE OF SHEETS OF GLASS.
APPLICATION FILED OCT. 1, 1903.
2 SHEETS—SHEET 1.
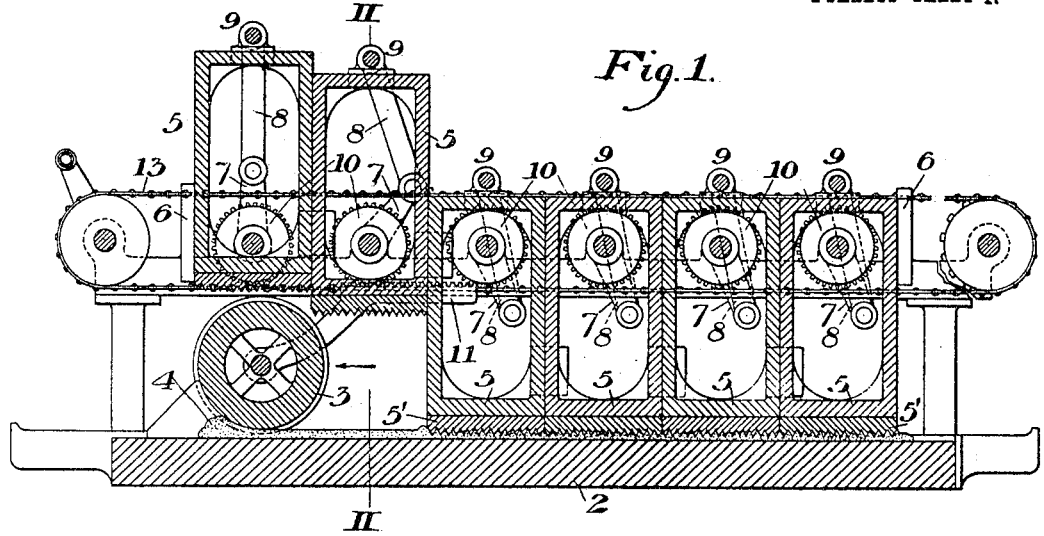
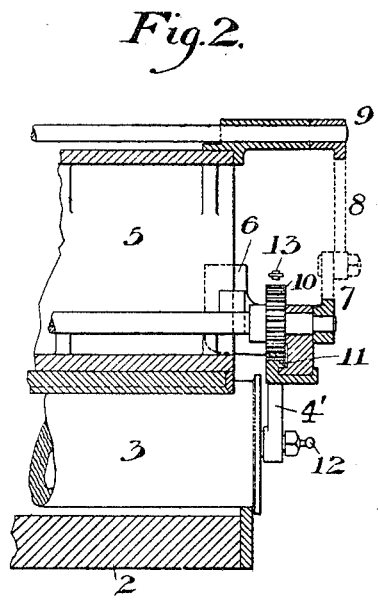
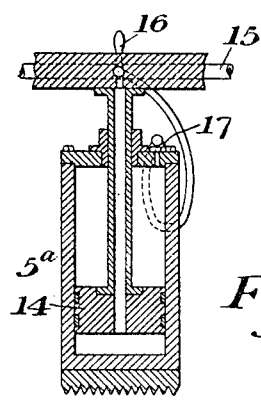
WITNESSES
INVENTOR No. 798,645. PATENTED SEPT. 5, 1905.
F. L. O. WADSWORTH.
MANUFACTURE OF SHEETS OF GLASS.
APPLICATION FILED OCT. 1, 1903.
2 SHEETS—SHEET 2.
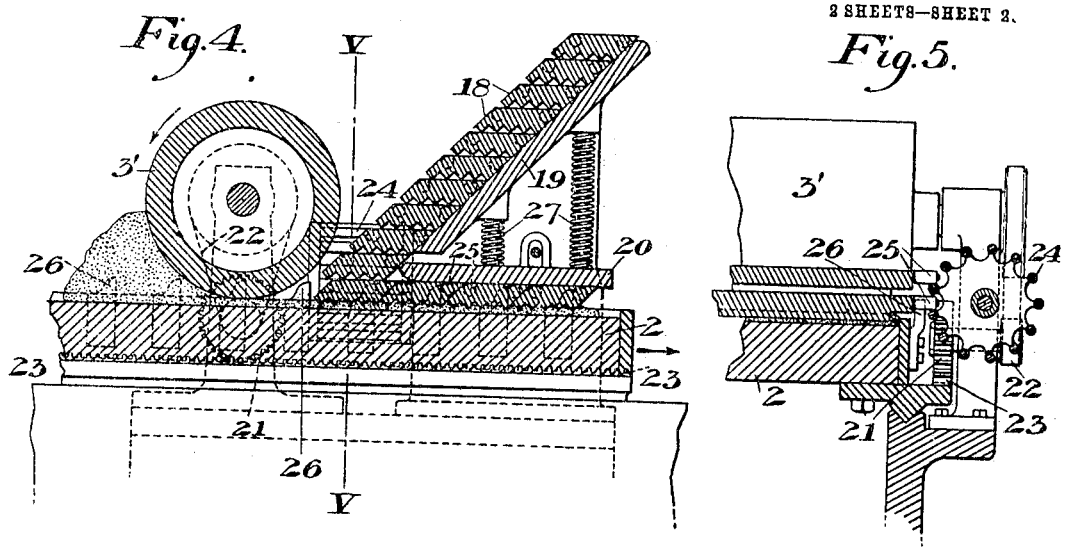
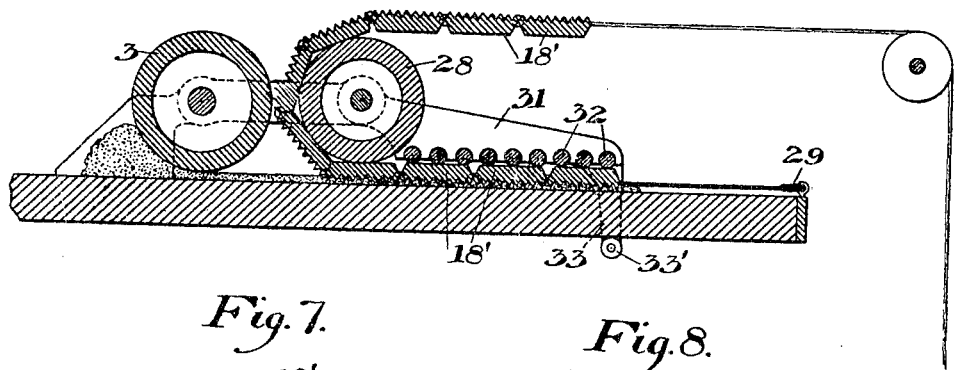
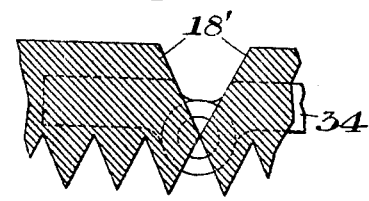
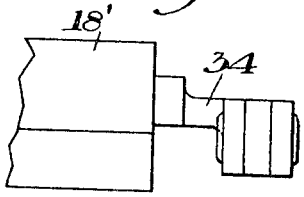
WITNESSES
Warren W. Swartz
H. M. Corwin
INVENTOR
F. L. O. Wadsworth

UNITED STATES PATENT OFFICE.

FRANK L. O. WADSWORTH, OF ALLEGHENY, PENNSYLVANIA.

MANUFACTURE OF SHEETS OF GLASS.

No. 798,645. Specification of Letters Patent. Patented Sept. 5, 1905.

Application filed October 1, 1903. Serial No. 175,296.

*To all whom it may concern:*

Be it known that I, FRANK L. O. WADSWORTH, of Allegheny, Allegheny county, Pennsylvania, have invented a new and useful Improvement in the Manufacture of Sheets of Glass, of which the following is a full, clear, and exact description, reference being had to the accompanying drawings, forming part of this specification, in which—

Figure 1 shows a vertical longitudinal section of apparatus suitable for the practice of my invention. Fig. 2 is a partial vertical section on the line II II of Fig. 1. Fig. 3 is a vertical section showing a modified construction of one of the plungers of Fig. 1, the plunger being adapted to be moved vertically to and from the surface of the glass sheet by fluid-pressure instead of the mechanical means illustrated in Fig. 1. Fig. 4 is a longitudinal section of a machine of modified construction suitable for the practice of my invention. Fig. 5 is a partial cross-section on the line V V of Fig. 4. Fig. 6 is a longitudinal section of another modification. Figs. 7 and 8 are detail views of the pressing-blocks shown in Fig. 6.

My invention consists in a new method of making sheets of glass in which the sheet is first spread from a molten mass of glass by means of a roller, and as it is spread it is successively pressed by suitable pressing devices, which follow the action of the roller. These pressing devices may be figured, so as to produce upon the glass a figured pattern either for ornamentation or for useful purposes, as where prisms are thus impressed.

My invention may be practiced with apparatus of various constructions other than those which I have shown in the drawings.

In Fig. 1, 2 is the table on which the glass sheet is spread, and 3 is a roll which is moved along the table by sprocket-chains or otherwise for the purpose of spreading the sheet from a mass of plastic glass 4 in the ordinary way. The pressing of the glass following the spreading action of the roll is accomplished by a series of vertical plungers 5 5, which are mounted in the frame of the machine side by side between vertical guides 6 6. They are actuated by cranks 7 and links 8, connecting the cranks at points 9 to the plunger. The cranks are actuated by gear-wheels 10, fixed to the crank-shafts and adapted to be rotated successively by a rack 11, which is connected to the carriage of the roll 3 and moves therewith. This rack is at the rear of the roll, and as the roll moves along the table in the direction of the arrow and spreads the glass sheet the rack engages successively the gear-wheels 10 and turns them so as to bring the plungers downward upon the surface of the glass. The plungers operate in succession, so that as soon as a portion of the glass sheet has been rolled and is exposed behind the roller the plunger engages it, impressing upon it the figured surface which is on the die-faces 5' at the lower ends of the plunger. When the glass sheet has thus been completely rolled and pressed, the plungers can be raised from its surface by detaching the pins 12, which connect the roll 3 to its carriage 4', and then moving back the rack 11 by reversing the motion of the sprocket-chain 13, which actuates the roll-carriage. As the rack is retracted it turns the gears 10 back to their original position and elevates the plungers from the glass, leaving the latter free to be removed.

The plungers may be maintained in their elevated position by any suitable means which will prevent the cranks 7 from passing their upper centers, as by a conical-ended spring-pressed pin (not shown) in the guide 6, seating in a conical recess in the plunger 5 at the proper time.

The plungers may be actuated by fluid-pressure, as illustrated in Fig. 3. In this case each plunger 5ª is mounted movably on a stationary piston 14, which is hollow, and is connected with a fluid-supply pipe 15 by a valve 16, so that when the air or other motive-fluid passes through the piston from this valve it will move the plunger downwardly. The lifting of the plunger may be effected by a second connection 17 between the valve and the upper end of the plunger, so that by moving the valve to connect the passage 17 with the supply and to connect the passage in the piston with the exhaust the fluid-pressure will raise the plunger. When the plungers are thus constructed, the workman operating the machine may move the valves so as to bring the plungers upon the glass successively as the roller advances, or these valves may be moved automatically by a suitable connection with the roll-carriage.

In Fig. 4 I show as means for successively pressing the portions of the glass a series of pressing-blocks 18, which are stacked in a pile on an inclined plane 19, beneath which is a presser-foot 20, parallel with the rollingtable 2. In this case the table 2 is arranged to be moved horizontally under the roll 3'. The roll is journaled in stationary bearings and is driven by suitable means. The table is moved horizontally at the same surface speed as the roll by a pinion 21, connected with the roll by a sprocket-chain 22 and with the table by a rack 23. The mass of plastic glass 4 is placed upon the table in the rear of the roll and is spread into the form of a sheet as the table moves under the roll. As the sheet passes beneath the pile of presser-blocks 18 the lowest block of the pile moves with it beneath the presser-foot 20, and a succeeding block drops upon the glass and is in turn carried under the presser-foot, which serves to hold the blocks in place until the glass has set. In order that each block may descend in right lines upon the surface of the sheet and may not tip as the support of the block beneath is withdrawn, I employ a guiding device consisting, preferably, of rotary wheel-like frames 24, rotated by the weight of the blocks, which frames are journaled at the ends of the pile of blocks and the teeth of which are engaged by pins, preferably faced with antifriction-rolls 25 at the front and rear corners of the blocks. The engagement of these pins with the frames prevents the block from tipping and causes it to descend with its under figured surface perfectly level upon the sheet. The teeth of the guide-frames 24 being horizontal offer no obstruction to the disengagement of the blocks as they are carried successively under the presser-foot.

In order that the pressing-blocks may be moved positively and may not be dependent upon their contact with the glass for carrying them under the presser-foot, I prefer to provide the table with projections 26, which engage the pins 25 on the blocks, and in order that the presser-foot 20 may yield somewhat to accommodate itself to the changes in the thickness of the glass I prefer to make it separate from the frame 19 and to back it with springs 27.

In the modification shown in Fig. 6 I show a modified construction of the pressing-blocks. In this case they are connected flexibly in a series which extends under a following roll 28, one end of the series being attached, as at 29, to the table and the other end attached to a weight or other yielding connection 30. The roll 28 is journaled in the carriage of the forming-roll 3 and moves with it. It is followed by a presser foot or feet 31, connected with the carriage and extending along the table, being provided with rollers 32 for engagement with the surfaces of the blocks. The presser-foot 31 is held against upward motion by arms 33, which extend downward and have roller-bearings 33', engaging the under surface of the table. As the roll 3 is moved over the mass of plastic glass it spreads it into a sheet, and the following roll 28 moves over the presser-blocks 18', pressing their figured faces successively down upon the surface of the sheet. The contact of the blocks with the glass is maintained after the roller 28 has passed and during the setting of the glass by the retaining action of the presser-foot 31.

The preferred construction of the pressing-blocks of Fig. 6 is shown in Figs. 7 and 8. Each block is pivoted to the next by arms 34, the pivotal axis being coincident with the joint between the adjacent blocks, so that the bending of the flexible series will not cause their separation.

I claim—

1. The method of making glass sheets which consists in spreading the glass on a supporting-surface and, before the completion of the spreading operation, pressing successive portions of the sheet against the supporting-surface; substantially as described.

2. The method of making glass sheets which consists in spreading the glass on a supporting-surface and, before the completion of the spreading operation, pressing the successive portions of the sheet against the supporting-surface and figuring it on the side opposite to that in contact with the supporting-surface; substantially as described.

3. The method of making glass sheets which consists in spreading the glass on a supporting-surface and, before the completion of the spreading operation, successively pressing the portions of the sheet against the supporting-surface and maintaining said pressure during the setting of the glass; substantially as described.

In testimony whereof I have hereunto set my hand.

FRANK L. O. WADSWORTH.

Witnesses:
JOHN MILLER,
H. M. CORWIN.